United States Patent
Dolgin

(10) Patent No.: US 9,323,034 B2
(45) Date of Patent: Apr. 26, 2016

(54) EYEPIECE FOR VARIABLE LATERAL MAGNIFICATION IMAGING SYSTEM

(71) Applicant: RAYTHEON COMPANY, Waltham, MA (US)

(72) Inventor: Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 131 days.

(21) Appl. No.: 14/161,131

(22) Filed: Jan. 22, 2014

(65) Prior Publication Data

US 2015/0205083 A1 Jul. 23, 2015

(51) Int. Cl.
| | |
|---|---|
| *G02B 17/08* | (2006.01) |
| *G02B 15/14* | (2006.01) |
| *G02B 25/00* | (2006.01) |
| *G02B 13/12* | (2006.01) |
| *G02B 23/00* | (2006.01) |

(52) U.S. Cl.
CPC ............ *G02B 17/0808* (2013.01); *G02B 13/12* (2013.01); *G02B 15/14* (2013.01); *G02B 25/001* (2013.01); *G02B 23/145* (2013.01)

(58) Field of Classification Search
CPC .... G02B 17/0808; G02B 13/18; G02B 15/14; G02B 25/001

USPC .......................................................... 359/364
See application file for complete search history.

(56) References Cited

U.S. PATENT DOCUMENTS

| | | | |
|---|---|---|---|
| 6,515,285 B1 * | 2/2003 | Marshall et al. ............... | 250/352 |
| 2004/0184163 A1 * | 9/2004 | Nishioka et al. ............... | 359/726 |
| 2015/0215516 A1 | 7/2015 | Dolgin | |
| 2015/0256768 A1 | 9/2015 | Dolgin et al. | |

OTHER PUBLICATIONS

"Foveated Imaging"—Wikipedia, the free encyclopedia, <http://en.wikipedia.org/wiki/Foveated_imaging>, accessed via the internet on Jan. 27, 2014, 4 pages.

* cited by examiner

*Primary Examiner* — Bumsuk Won
*Assistant Examiner* — Grant Gagnon
(74) *Attorney, Agent, or Firm* — Lando & Anastasi, LLP

(57) ABSTRACT

Optical imaging systems and methods providing having variable lateral zoom. In one example, an optical imaging system with variable lateral zoom includes primary optics configured to receive and direct incident electromagnetic radiation from a viewed scene onto a focal plane to form a substantially planar intermediate image at the focal plane, the intermediate image having substantially uniform lateral magnification, an eyepiece optically coupled to the primary optics and configured to reimage the intermediate image onto an image plane to produce an output image having variable lateral magnification, and a photo-sensitive detector positioned at the image plane.

10 Claims, 13 Drawing Sheets

EYEPIECE FOR VARIABLE LATERAL MAGNIFICATION IMAGING SYSTEM

BACKGROUND

Imaging and optical sensing devices are widely used in both commercial and military applications. Many applications involve long range tracking, and as a result, require a high level of magnification, or zoom, in the optics. Tracking small objects, such as vehicles or people, from long range, for example, from an unmanned aerial vehicle (UAV) platform, is difficult because the high zoom of the tracking optics required to see the object necessitates a narrow field of view. As a result of the narrow field of view, it is difficult to reacquire the object if it is lost due to terrain, shadows, or other phenomena. Similarly, high-zoom optical scopes or sights, such as those used for aiming a weapon such as a rifle or vehicle-mounted gun, for example, also suffer from poor situational awareness. The user cannot observe things that are even just outside the narrow field of view.

Traditional approaches to addressing these issues have involved the use of variable zoom optics. However, such systems suffer from several disadvantages and are only somewhat effective. For example, there is a time delay associated with changing the zoom, during which time the target object may move outside of the field of view. Also, in certain systems the optics are not focused during the zooming action, and therefore the target object may not be visible during the zoom and may be lost as a result. Additionally, variable zoom optics for certain applications, such as rifle scopes or similar aiming devices, are difficult and expensive to manufacture due to high tolerances. Furthermore, the moving parts associated with most traditional variable zoom optics are common points of failure in the system.

SUMMARY OF INVENTION

Aspects and embodiments are directed to eyepiece for an optical imaging system capable of providing simultaneous varying degrees of magnification over the field of view of the optics, without requiring moving parts.

According to one embodiment, an optical imaging system having variable lateral zoom comprises primary optics configured to receive and direct incident electromagnetic radiation from a viewed scene onto a focal plane to form a substantially planar intermediate image at the focal plane, the intermediate image having substantially uniform lateral magnification, an eyepiece optically coupled to the primary optics and configured to reimage the intermediate image onto an image plane to produce an output image having variable lateral magnification, and a photo-sensitive detector positioned at the image plane.

In one example, the detector has a surface that is substantially flat in the image plane. In another example, the eyepiece comprises a curvature enhancer positioned on the focal plane and configured to curve the focal plane to form a curved focal plane, and at least one variable focus lens or mirror configured to reimage the intermediate image formed at the curved focal plane onto the image plane. In one example, the curvature enhancer includes a cylindrical concave lens. In another example, the curvature enhancer includes a pair of cylindrical lenses.

According to another embodiment, an eyepiece for an optical system comprises a curvature enhancer configured to receive and bend incident electromagnetic radiation to produce a curved focal plane, and at least one variable focus lens or mirror optically coupled to the curvature enhancer and configured to receive the electromagnetic radiation from the curvature enhancer and to focus the electromagnetic radiation onto an image plane. In one example, the curvature enhancer includes a concave lens or convex mirror placed proximate the curved focal plane. In another example, the curvature enhancer includes a pair of cylindrical lenses.

According to another embodiment, an imaging method comprises receiving incident electromagnetic radiation, bending the electromagnetic radiation to form a curved focal plane, relaying the electromagnetic radiation from the curved focal plane onto a photo-sensitive detector positioned on an image plane, the photo-sensitive detector having a surface that is substantially flat in the image plane, and with the photo-sensitive detector, producing an image from the electromagnetic radiation, the image having variable lateral magnification.

In one example of the imaging method, bending the electromagnetic radiation includes refracting the electromagnetic radiation with a concave lens to the form the curved focal plane. In another example, relaying the electromagnetic radiation includes directing and focusing the electromagnetic radiation onto the image plane using at least one lens or at least one mirror. The method may further comprise varying an axial zoom level of the image by moving the at least one lens towards or away from the photo-sensitive detector along an optical axis extending between the curved focal plane and the image plane.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
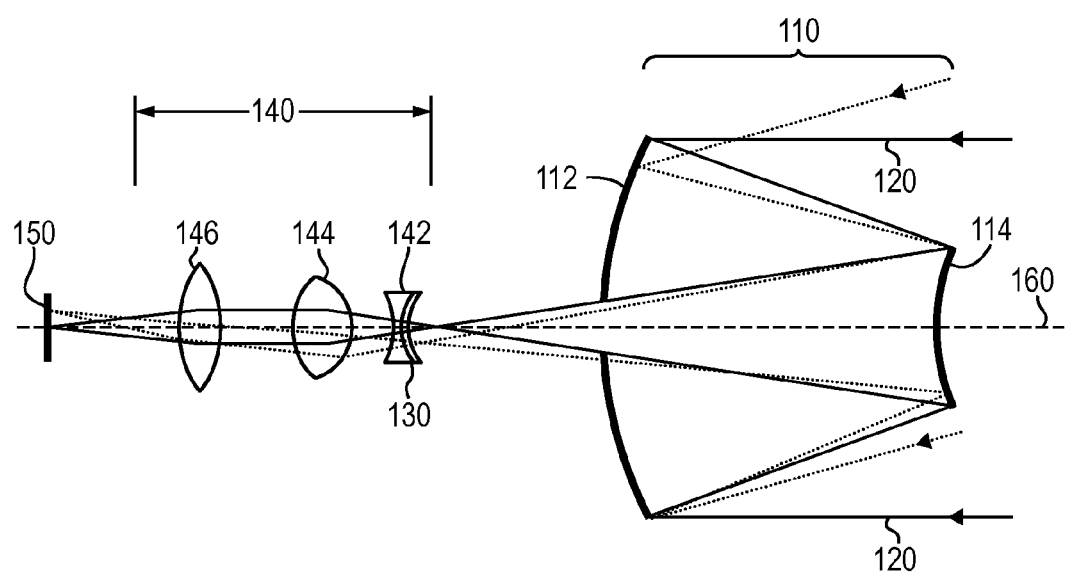
FIG. 1 is a block diagram of one example of an optical system including an eyepiece configured to provide variable lateral magnification over the field of view of the optical system, according to aspects of the invention.

Aspects and embodiments are directed to optical systems that are configured to provide different levels of magnification over the field of view of the optics, as discussed in more detail below. In particular, aspects and embodiments are directed to an optical eyepiece configured to provide variable levels of magnification. Embodiments of this eyepiece may be used as a replacement component for a conventional eyepiece in an optical system without requiring changes to the primary optics, as discussed further below. With this capability, the system may provide both a relatively wide field of view that facilitates acquiring target objects and preventing the target object from being lost as it moves, and a relatively high zoom in a portion of the field of view that facilitates precise viewing and tracking of the target object. The ability to simultaneously view a wide field of view and have high zoom in a selected region of the field of view (for example, the center) may provide greatly improved situational awareness and significantly ease the task of tracking of small objects at long range.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Unlike the lenses of human eyes, and traditional optical lenses, which have a relatively constant level of magnification over the entire lens, lenses in the eyes of certain birds of prey (e.g., eagles) have much higher magnification and distribution of the optical receptors in the center compared to that at the periphery. Thus, if a target object (e.g., a mouse or other small animal in the case of an eagle) is in the center of the field of view, the bird is able to see the animal with a large amount of detail (enabling the bird to hunt the animal), whereas at the periphery of the field of view the bird is barely able to see the animal. This adaption addresses the issues discussed above, namely that tracking a small, and particularly fast moving object, through a field of view similar to a narrow angle camera is extremely difficult. With the variable resolution in the bird's eyes, although the area of high resolution is reduced, the bird is nonetheless still able to see and track the animal when it moves slightly out of the center of the field of view.

Aspects and embodiments are directed to optical systems that are configured to provide similar capability. In particular, according to certain embodiments, an eyepiece is provided in an optical imaging system, the eyepiece configured to produce an image of a viewed scene that has a variable magnification over the field of view of the optics. This image may be directly viewed through the eyepiece by an operator, or may be displayed on a display coupled to the optical imaging system. As a result, certain portion of the image may be viewed with high resolution, while still maintaining the ability to also (and simultaneously) view a wider field of view with lower resolution. As used herein, the term "variable lateral magnification" is intended to refer to such an arrangement, where the magnification is variable over the field of view of the optical system, and therefore variable over the surface of the display in applications in which a display is used. In one embodiment, the eyepiece is configured to provide higher magnification at and near the center of the field of view, and lower magnification at the periphery; however, other configurations may be implemented, as discussed further below. In one example, such an optical system may be used by the operator of a UAV, or in a rifle scope, for example, although the system may be used in numerous other applications.

Referring to FIG. 1, there is illustrated a block diagram of one example of an optical system having variable lateral magnification according to certain embodiments. The optical system 100 includes primary optics 110, also optionally referred to as a telescope or foreoptics, which are configured to receive incident electromagnetic radiation 120 from a viewed scene and focus the electromagnetic radiation onto a focal plane 130. The optical system further includes an eyepiece 140 configured to direct and focus the electromagnetic radiation 120 from the focal plane 130 onto a detector 150 positioned at an image plane of the system. The detector 150 may include any type of photo-sensitive detector operable to produce an image (or electrical signals representative of an image) of the viewed scene from the received electromagnetic radiation, such as a focal plane array (FPA), for example. The electromagnetic radiation 120 may include one or more spectral bands, including for example, ultraviolet (UV), visible light, infrared radiation and/or longer wavelength radiation. The detector may be selected to be sensitive to the electromagnetic radiation 120 in a wavelength range of interest. In the illustrated example, the primary optics 110 includes two reflecting mirrors 112 and 114; however the primary optics may include any number of a variety of optical elements, reflective or refractive, arranged in any of numerous well known configurations, not limited to the two-mirror arrangement shown in FIG. 1.

Figure 2:
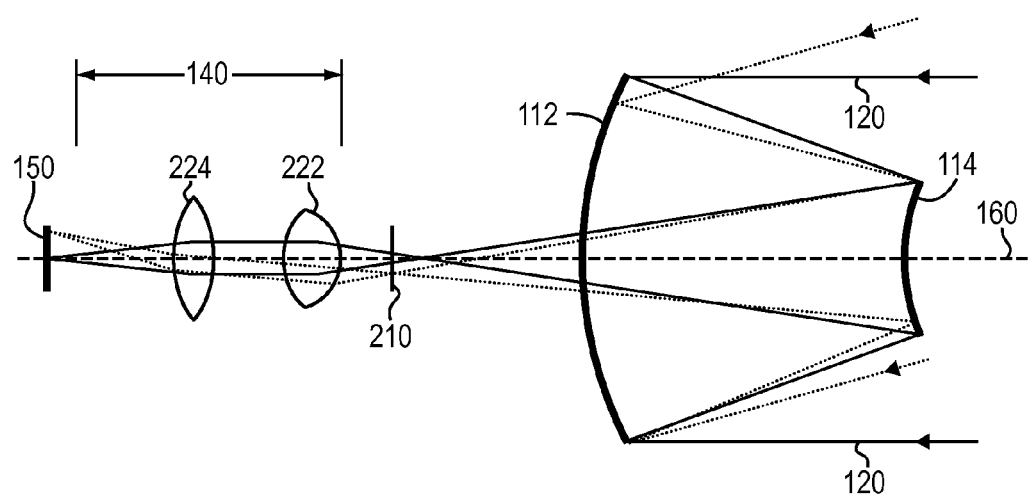
FIG. 2 is a block diagram of one example of a conventional optical imaging system.

Referring to FIG. 2, in conventional optical imaging systems, the primary optics 110 are arranged to focus the electromagnetic radiation 120 onto a substantially flat focal plane 210. A conventional eyepiece 220 is then used to reimage the intermediate image formed at the flat focal plane 210 onto a flat detector 150. Typically, it is desirable that the focal plane 210 be as flat as possible, so as to minimize distortion when reimaging onto the flat detector 150. Optical zoom may be provided by the eyepiece, and is achieved by moving one or more of lenses 222 and/or 224 of the eyepiece 220 along the optical axis 160, towards or away from the detector 150. The optical zoom achieved in such a system is uniform over the field of view of the optics.

In contrast, referring again to FIG. 1, the eyepiece 140 according to embodiments of the present invention includes a curvature enhancer 142 positioned at the focal plane 130 and configured to produce a curved focal plane 130. As a result, variable lateral magnification is achieved in the image over the field of view by reimaging the curved focal plane onto a flat detector using a variable power lens. The curved focal plane 130 causes there to be a variation in the distance between the focal plane and the detector 150 over the surface of the detector, resulting in different magnification of the image produced at the detector over the surface of the detector, and therefore over the field of view of the system. The degree or level of magnification may be controlled using variable zoom lenses 144, 146 in the eyepiece 140. Although in the example illustrated in FIG. 1, the eyepiece 140 includes two lenses 144, 146, other embodiments of the eyepiece may include more or fewer than two lenses, and may also or alternatively include reflective optical elements (e.g., one or more mirrors) rather than, or in addition to, refractive elements.

Figure 3A:
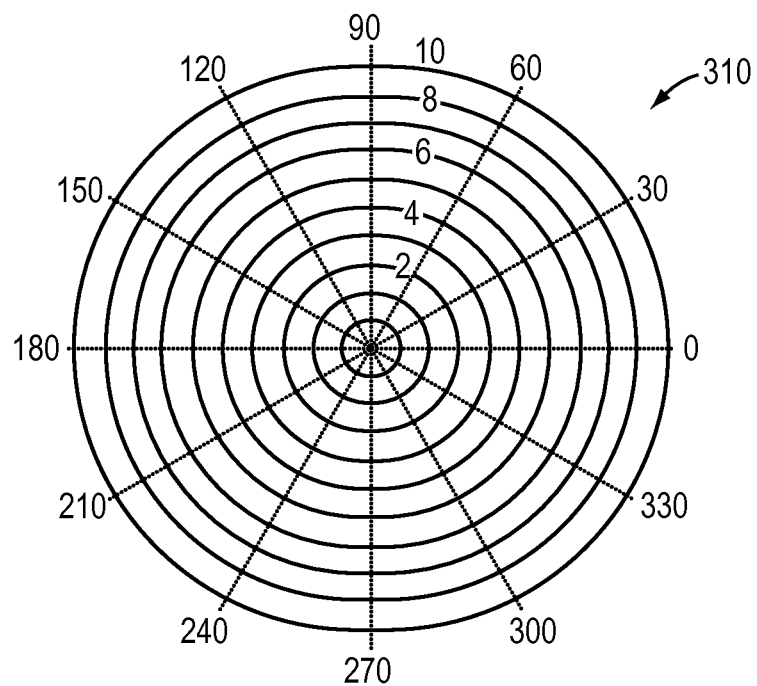
FIG. 3A is a diagram illustrating a representation of conventional uniform magnification over a field of view.
Figure 3B:
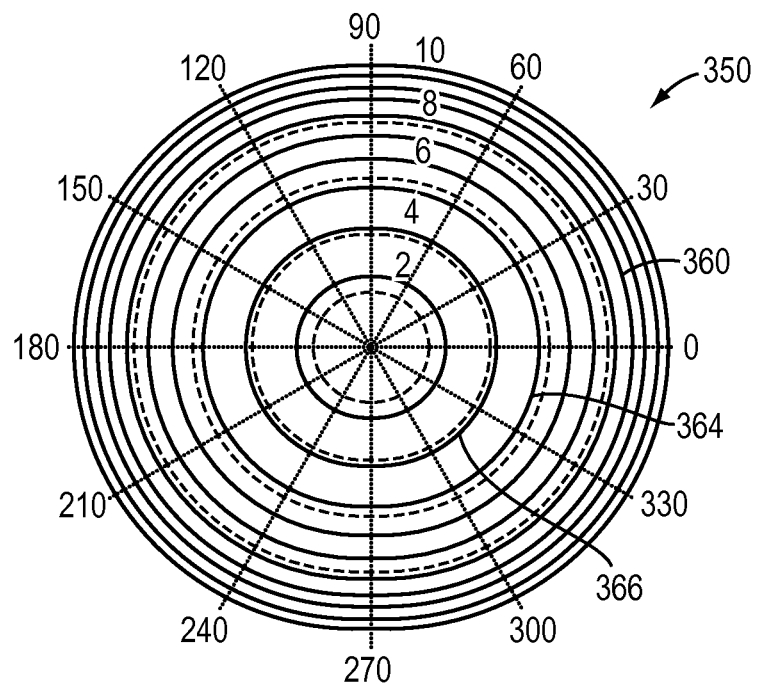
FIG. 3B is a diagram illustrating an example of variable lateral magnification over a field of view according to aspects of the invention.

FIGS. 3A and 3B demonstrate the difference between a uniform level and distribution of magnification over a field of view and variable lateral magnification as may be achieved using embodiments of the eyepiece 140 discussed herein and a cylindrically symmetric convex-convex curvature enhancer. FIG. 3A illustrates a field of view 310 having a uniform magnification distribution, as may be produced, for example, by the conventional system of FIG. 2. The uniform magnification is represented by contour lines 320, 325 which are evenly spaced. In this case, the magnification may be high or low, but it is uniform over the entire field of view 310. In contrast, FIG. 3B illustrates a field of view 350 having variable lateral magnification, as may be produced, for example, using an embodiment of the eyepiece 140. In the case of FIG. 3B, the magnification varies over the field of view 350, as represented by variably spaced contour lines 360, 362, 364, and 366. In this illustrated example, the magnification is higher towards the center of the field of view 350 (the contour lines are further apart), and lower towards the periphery of the field of view (where the contour lines are more closely spaced).

Figure 4:
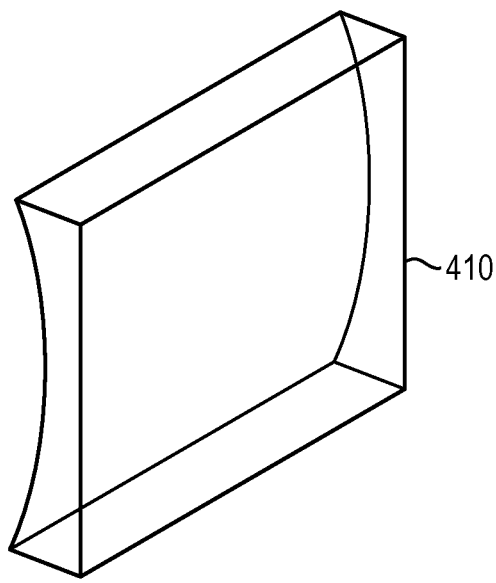
FIG. 4 is a diagram of one example of a concave lens which may be used as a curvature enhancer in an eyepiece configured to provide variable lateral magnification over the field of view of the optical system, according to aspects of the invention.

According to one embodiment, a variable lateral magnification distribution of the type illustrated in FIG. 3B (i.e., higher magnification in the center of the field of view and lower magnification towards the periphery) may be achieved with the eyepiece 140 in which the curvature enhancer 142 includes a concave lens placed at the focal plane 130 of the primary optics 110, as discussed above. An example of a concave lens 410 which may be used for the curvature enhancer 142 is illustrated in FIG. 4. The remaining elements 144 and 146 of the eyepiece 140 may be variable zoom lenses, similar to or even the same as conventional eyepiece optics used in similar uniform-magnification systems. With such a configuration, the magnification decreases radially from the center of the field of view to the periphery as the concave lens of the curvature enhancer 142 images the curved focal plane 130 onto the substantially flat detector 150. This arrangement may advantageously provide improved ability to aim at or track a target in or near the center of the field of view (since the high magnification in this region may provide high resolution imaging of the target), while maintaining a larger degree of situational awareness at the periphery.

Figure 5A:
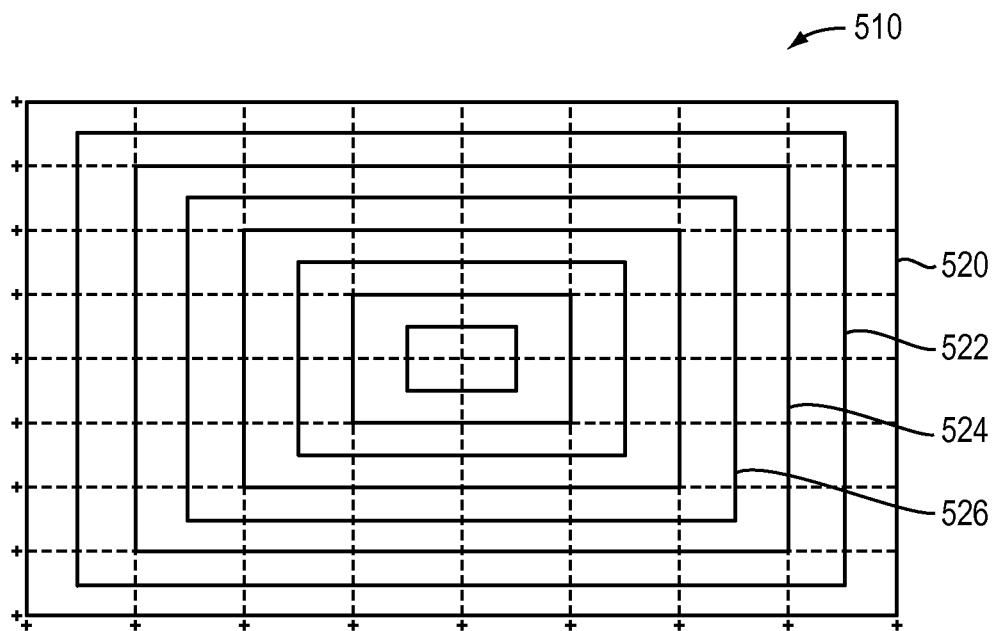
FIG. 5A is a diagram illustrating another representation of conventional uniform magnification over a field of view.
Figure 5B:
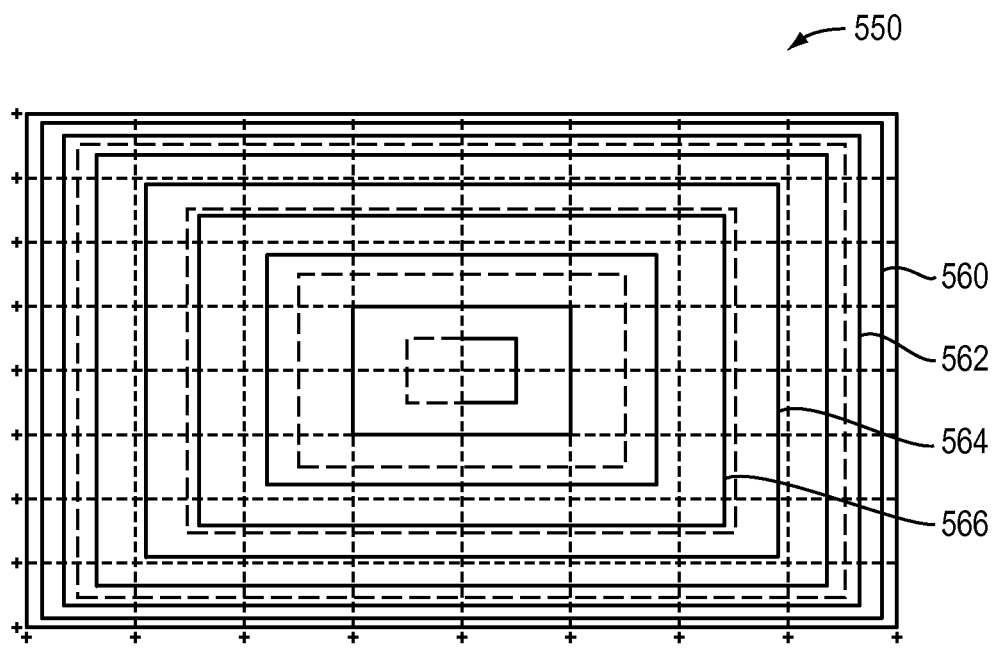
FIG. 5B is a diagram illustrating another example of variable lateral magnification over a field of view according to aspects of the invention.
Figure 6:
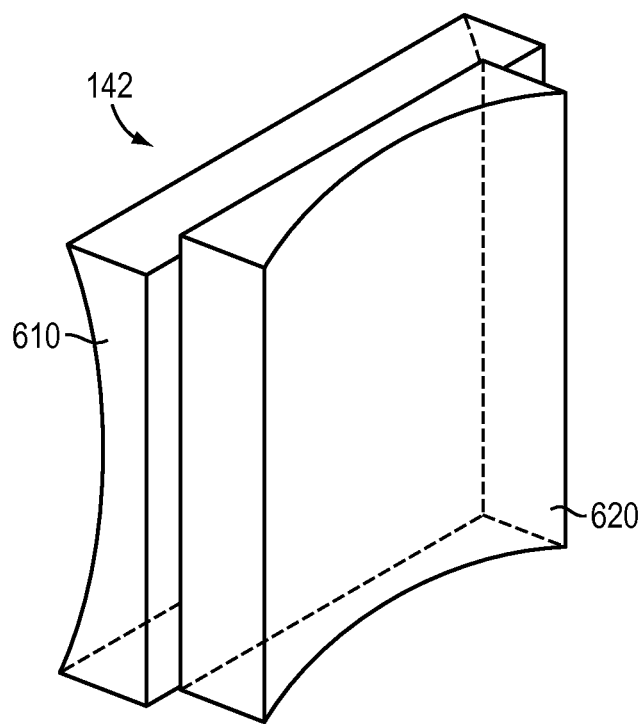
FIG. 6 is a diagram of one example of a curvature enhancer including a pair of cylindrical lenses, according to aspects of the invention.

FIGS. 5A and 5B demonstrate the difference between a uniform level and distribution of magnification over a field of view and variable lateral magnification as may be achieved using embodiments of the eyepiece 140 discussed herein and a curvature enhancer 142 comprising two cylindrical lenses 610, 620, as shown, for example, in FIG. 6. FIG. 5A illustrates a field of view 510 having a uniform magnification distribution, as may be produced, for example, by the conventional system of FIG. 2. The uniform magnification is represented by contour lines 520, 522, 524, 526 which are evenly spaced. In this case, the magnification may be high or low, but it is uniform over the entire field of view 510. In contrast, FIG. 5B illustrates a field of view 550 having variable lateral magnification, as may be produced, for example, using an embodiment of the eyepiece 140 including a curvature enhancer 142 comprising two cylindrical lenses 610, 620, as discussed above. In the case of FIG. 5B, the magnification varies over the field of view 550, as represented by variably spaced contour lines 560, 562, 564, and 566. In this illustrated example, the magnification is higher towards the center of the field of view 550 (the contour lines are further apart), and lower towards the periphery of the field of view (where the contour lines are more closely spaced).

Figure 7:
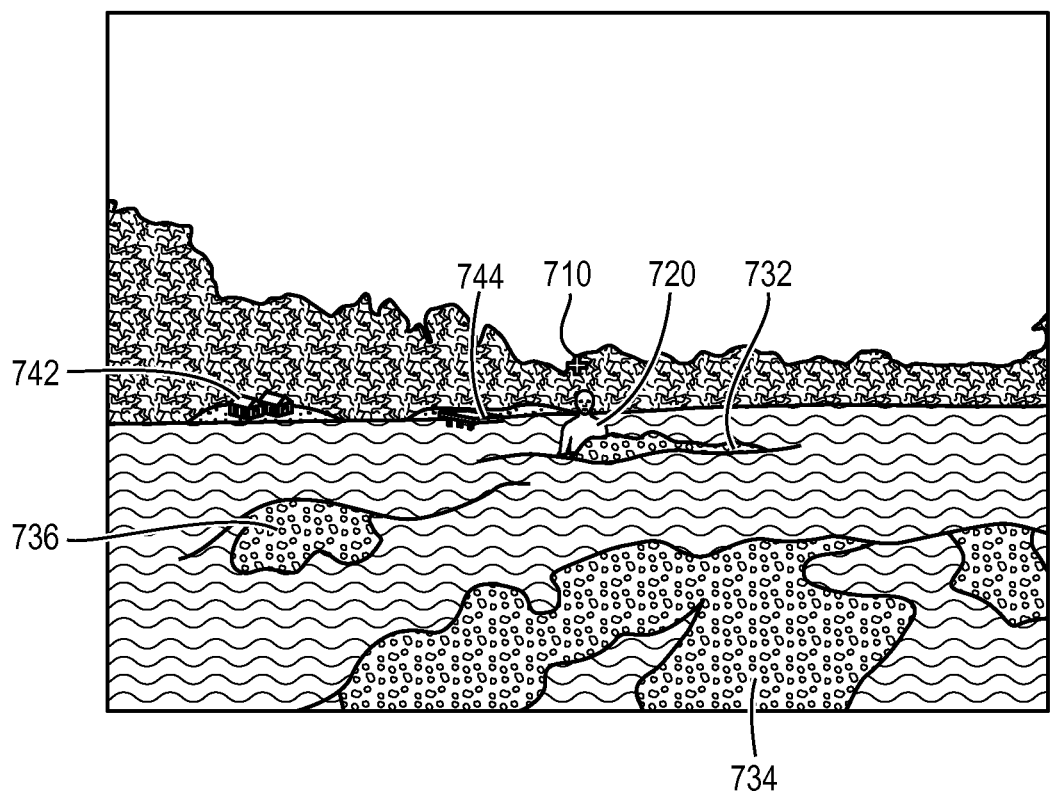
FIG. 7 is a representation of an image of a scene.

Differences between an image produced using embodiments the variable lateral magnification eyepiece discussed above, and a conventional zoomed image (uniform lateral magnification) are demonstrated with reference to FIGS. 7, 8A-C, 9A-C, and 10A-C and discussed further below. FIG. 7 is a representation of a "base-line" image. Marker 710 represents the center of the base-line image, and the "aim point" for a targeting or tracking application. The image of FIG. 4 includes a target 720 (i.e., the target desired to be tracked), features 732, 734, and 736, and objects 742 and 744.

Figure 8A:
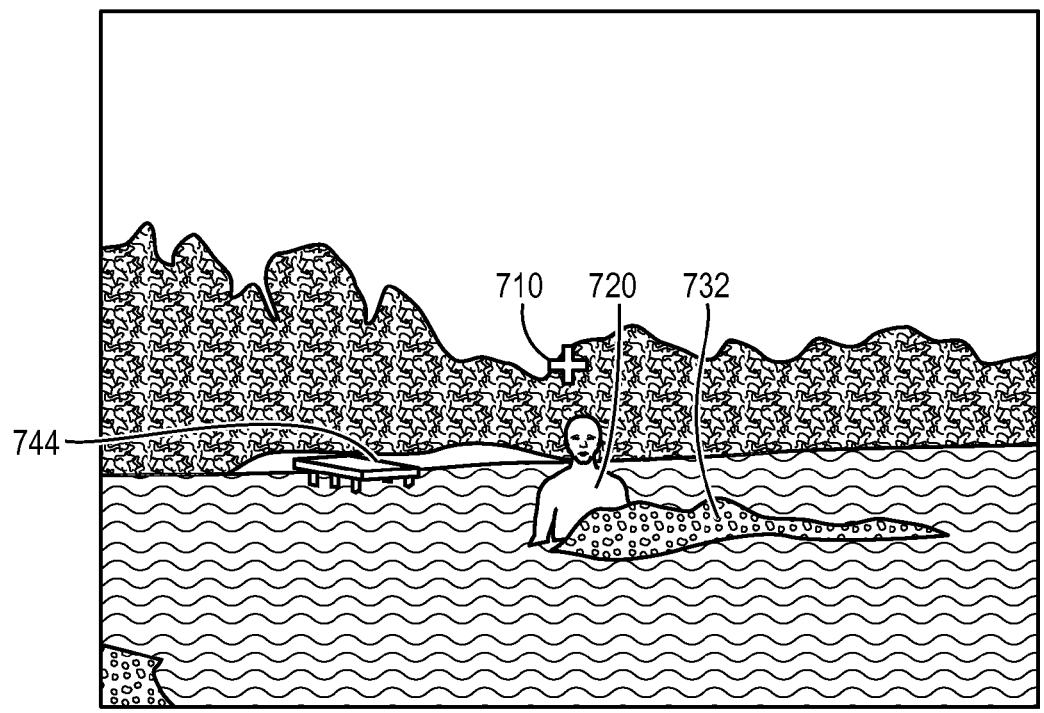
FIGS. 8A-C are representations of magnified versions of the image of FIG. 7 using different levels of conventional uniform magnification.
Figure 8B:
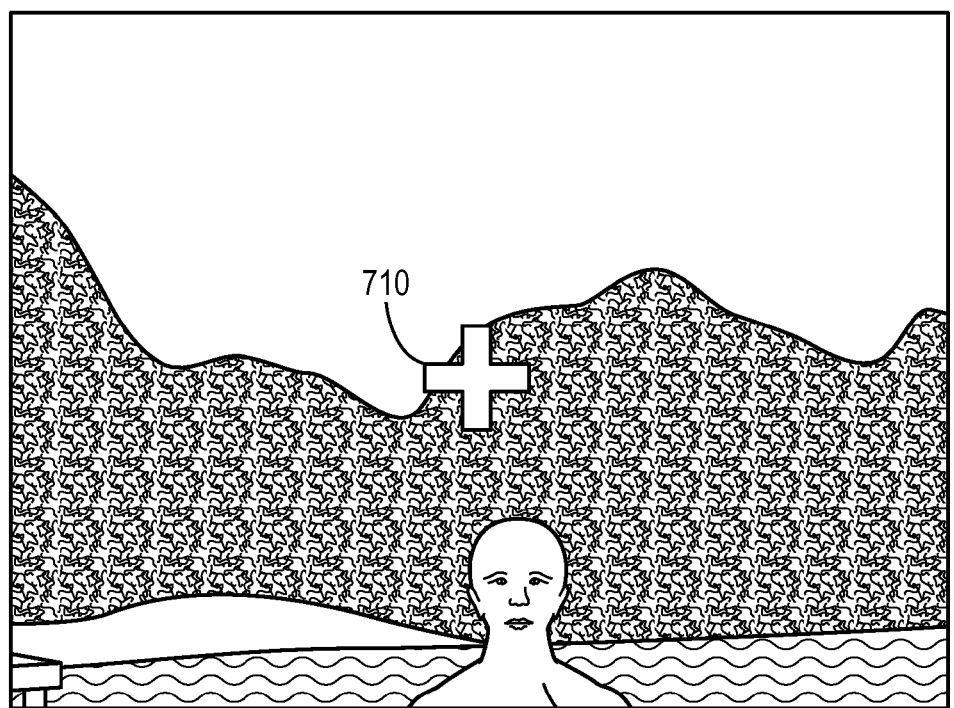
Figure 8C:
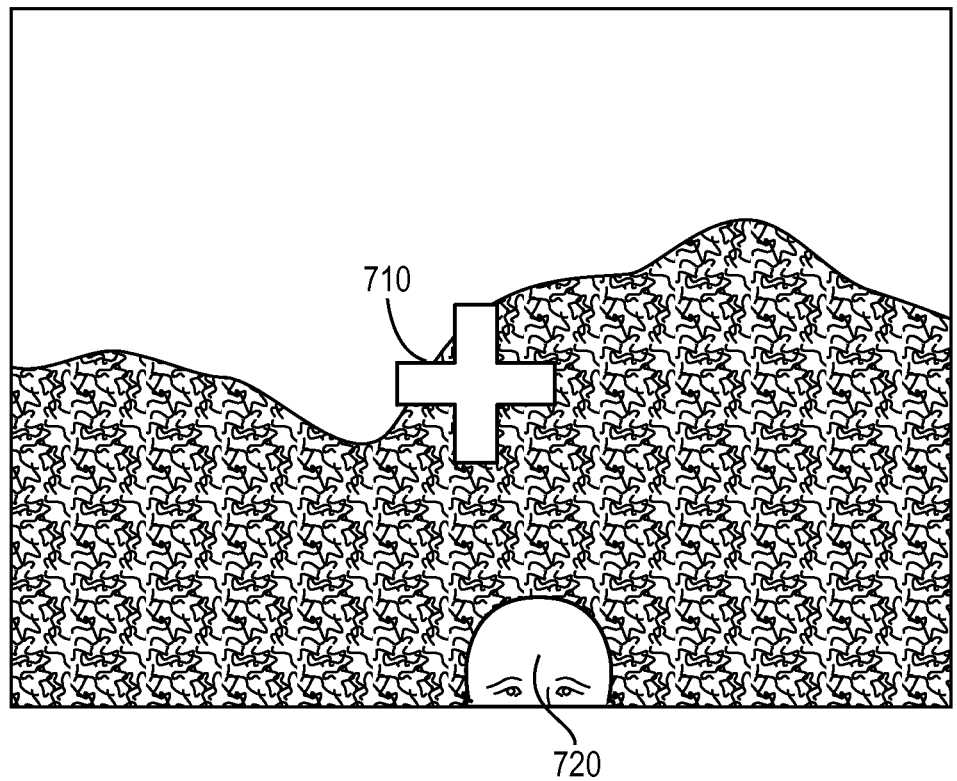

FIGS. 8A-C are representations of "zoomed" versions of the image of FIG. 7 produced using conventional optical or digital zoom. FIG. 8A is a representation of the image with a 3.2× zoom. FIG. 8B is a representation of the image with a 6.4× zoom. FIG. 8C is a representation of the image with a 10X zoom. The marker 710 is in the same position in each image. As may be seen with reference to FIGS. 7 and 8A-C, as the magnification (or zoom level) increases, the field of view captured in the image decreases, and significant peripheral vision is lost. In addition, at relatively high magnification (FIG. 8B), the target 720 is already significantly off-center in the image, such that a portion of the target is no longer visible. At high magnification (FIG. 8C), only a small portion of the target 720 remains in the image and almost all contextual information is lost.

Figure 9A:
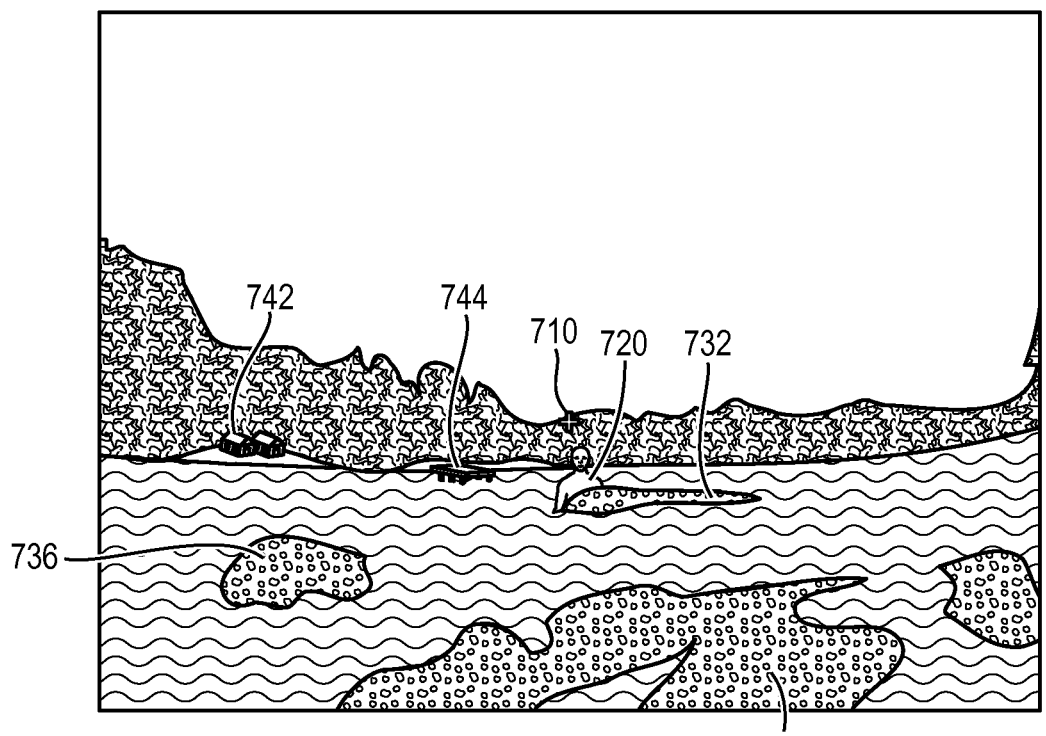
FIGS. 9A-C are representations of magnified versions of the image of FIG. 7 using different levels of variable lateral magnification according to aspects of the invention.
Figure 9B:
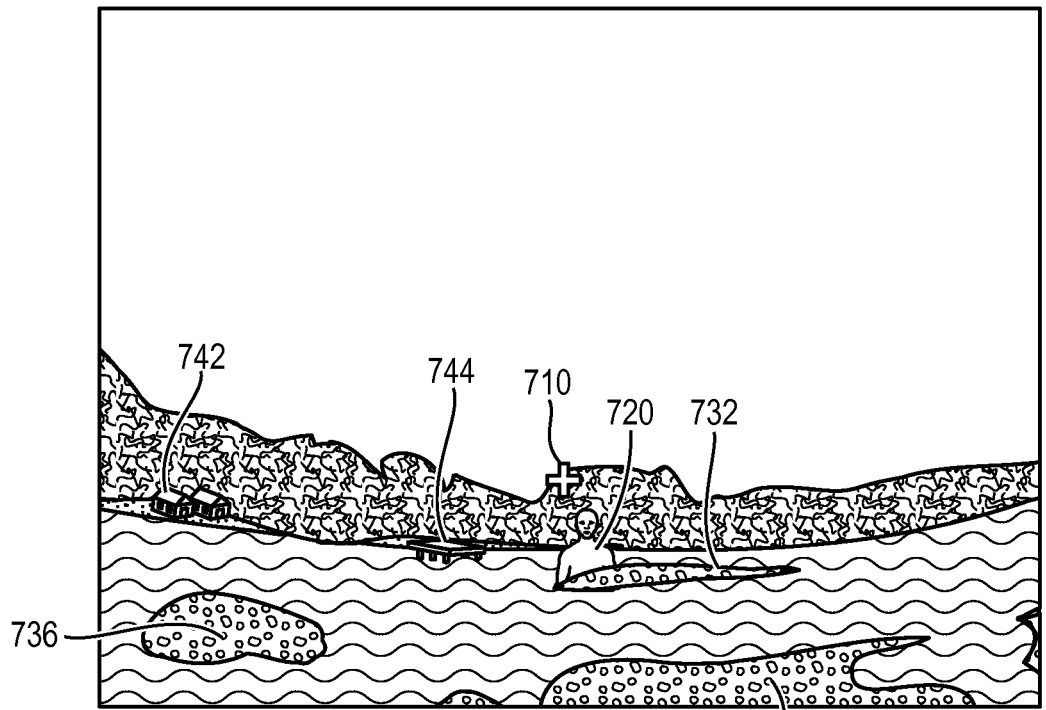
Figure 9C:
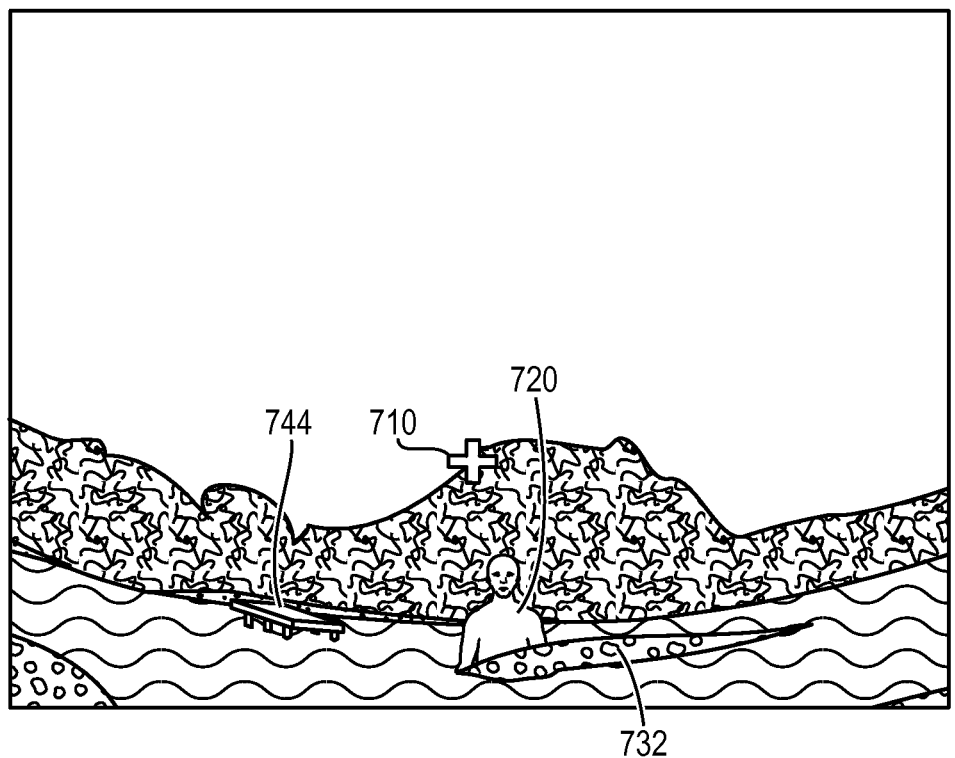
Figure 10A:
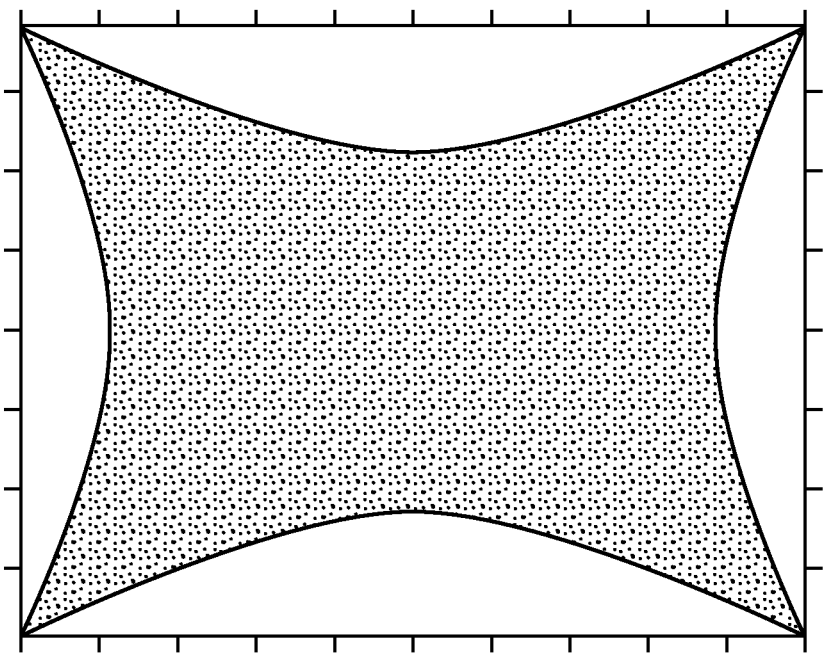
FIGS. 10A-C are diagrams illustrating the portion of the image of FIG. 2 retained in each of the variable lateral magnification images of FIGS. 9A-C, respectively.
Figure 10B:
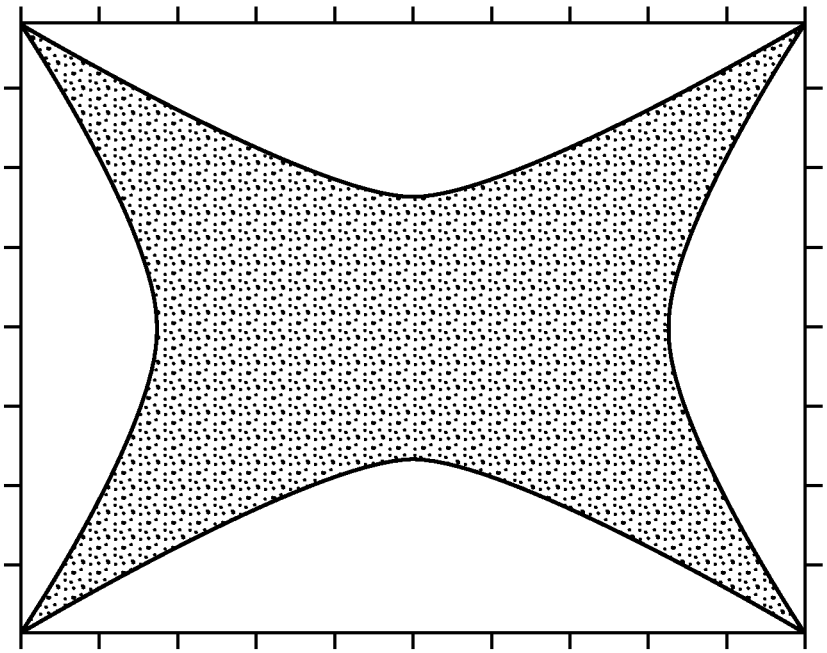
Figure 10C:
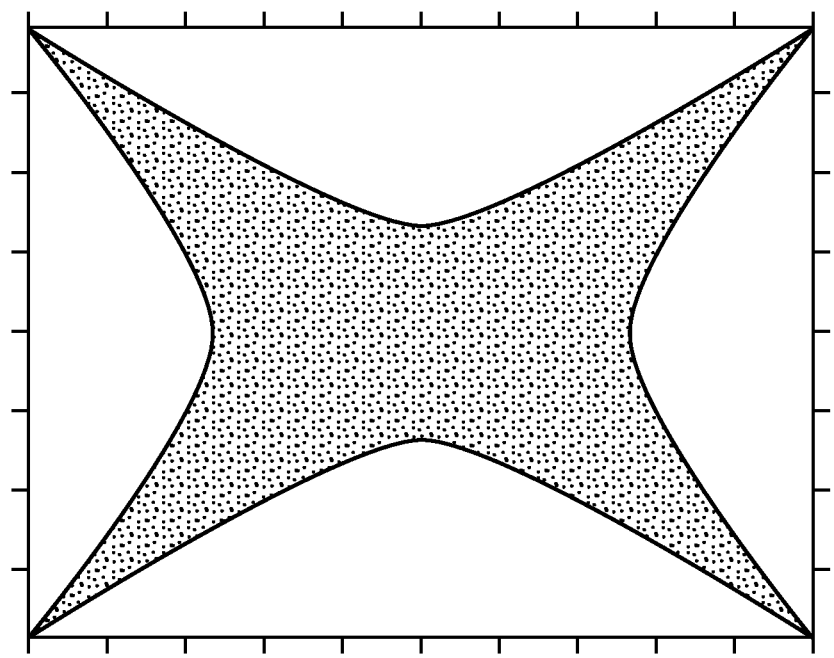

FIGS. 9A-C are representations of "zoomed" versions of the image of FIG. 2 using an embodiment of the eyepiece 140 to produce images with variable lateral magnification as discussed above and represented in FIG. 3B. FIG. 9A is a representation of the image having a vertical compression (top to bottom) of 4× and a horizontal compression (left to right) of 5× relative to the baseline image of FIG. 4. FIG. 9A illustrates the portion of the original image (represented in FIG. 7) that is reproduced using the variable lateral magnification configuration. As may be seen with reference to FIG. 10A, the information at the edges of the image is lost. This results in some image distortion, as is visible in FIG. 9A. The representation shown in FIG. 9A corresponds roughly to the zoom level of FIG. 8A, and comparing FIGS. 8A and 9A, it may be seen that that the target 720 is of similar size (resolution and magnification) in both images. However, the image produced using variable lateral magnification retains coverage of a larger field of view, thereby providing better contextual information and situational awareness.

FIG. 9B is a representation of the image having a vertical compression of 6× and a horizontal compression of 11× relative to the baseline image of FIG. 7. FIG. 9B illustrates the portion of the original image (represented in FIG. 7) that is reproduced using the variable lateral magnification configuration. As may be seen with reference to FIG. 10B, information at the edges of the image is lost, and the higher compression results in more image distortion, as is visible in FIG. 9B. The representation shown in FIG. 9B corresponds roughly to the zoom level of FIG. 8B. FIG. 9C is a representation of the image having a vertical compression of 8× and a horizontal compression of 18× relative to the baseline image of FIG. 4. FIG. 9C illustrates the portion of the original image (represented in FIG. 7) that is reproduced using the variable lateral magnification configuration. As may be seen with reference to FIG. 10C, information at the edges of the image, and extending towards the central portion of the image is lost. This results in significant image distortion, as is visible in FIG. 9C. However, even in the distorted image, the target 720 remains relatively centrally located, close to the marker 710, and coverage of a large portion of the original field of view is retained (for example, objects 444 are still visible, although distorted).

Comparing FIG. 9B with FIG. 8B, and comparing FIG. 9C with FIG. 8C it can be seen that, using variable lateral magnification, the target 720 is both magnified and remains more centrally positioned in the image without requiring the center point (or aiming point) represented by marker 710 to be moved. Thus, whereas the target 720 may be easily lost when using a conventional high zoom camera (producing images such as that represented in FIG. 8C), using an eyepiece 140 to produce variable lateral magnification according to embodiments of the present invention it may be significantly easier to keep with the target within the field of view.

From FIGS. 9A-C it may be seen that the variable lateral magnification eyepiece allows for production of an image that has a large amount of detail associated with a central portion of the image, and therefore the target 720, and yet retains the contextual information surrounding the target since the overall field of view covered by the image remains similar to that of the original image of FIG. 2. Although the eyepiece 140 produces some image distortion, this may be accommodated in various ways. For example, a system operator may be trained to account for the distortion in the images. Software tracking algorithms may be designed to accommodate the distortion. Additionally or alternatively, digital post-processing may be used to reduce or even eliminate the distortion. Thus, the images produced using variable lateral magnification may facilitate accurate aiming at the target 720, while also maintaining a relatively wide field of view, making tracking of the target as it moves much easier.

A concept that is similar to variable lateral magnification in some respects, although vastly different in others, is foveated imaging, which is a digital image processing technique in which the image resolution, or amount of detail, varies across the image according to one or more "fixation points." A fixation point indicates the highest resolution region of the image and corresponds to the center of the eye's retina, the fovea. The location of a fixation point may be specified, either manually or by a computer algorithm, using a pointing device, such as a computer mouse, for example, or using an eye-tracking mechanism that monitors the position of the eye. A foveated image maintains a large field of view, and has high resolution at the fixation points in the image, but has a blurred periphery and no magnification (or uniform magnification over the whole image). By contrast, an image with variable lateral magnification according to embodiments discussed above has high magnification over a portion of the image (e.g., the central region) and lower magnification elsewhere, while also maintaining a large field of view. In addition, as discussed above and illustrated in FIGS. 9B and 9C, images with high variable lateral magnification may have distortion; whereas foveated images are generally not distorted, other than having a blurred periphery. Furthermore, as discussed above providing images with variable lateral magnification may significantly improve a human operator's ability to track and aim at a moving target, whereas this benefit is not achieved with foveated imaging.

Thus, aspects and embodiments may provide optical imaging systems capable of providing an image with variable lateral magnification over the field of view, which allows for a greatly improved ability to track a target. As discussed above, the variable lateral magnification may be produced using an eyepiece 140 that includes a curvature enhancer 142. The eyepiece 140 may be easily substituted for a conventional eyepiece in an imaging system without requiring modification of the primary optics 110. Thus, embodiments of the eyepiece 140 may be used to easily convert a conventional imaging system into one capable of providing variable lateral magnification. In certain embodiments, a conventional eyepiece and an embodiment of the eyepiece 140 may be movable into and out of the optical path of an optical imaging system (for example, through placement on a movable or rotatable platform in the system), to allow an operator to dynamically select between a conventional uniform lateral magnification configuration and a variable lateral magnification configuration.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical imaging system having variable lateral zoom comprising:
   primary optics configured to receive and direct incident electromagnetic radiation along an optical path from a viewed scene onto a focal plane to form a substantially planar intermediate image at the focal plane, the intermediate image having substantially uniform lateral magnification;
   an eyepiece optically coupled to the primary optics and configured to reimage the intermediate image along the optical path onto an image plane spaced away from the focal plane to produce an output image having variable lateral magnification, the eyepiece including a curvature enhancer positioned proximate the focal plane and configured to curve the focal plane to form a curved focal plane, and at least one variable focus lens configured to reimage the intermediate image formed at the curved focal plane onto the image plane; and
   a photo-sensitive detector positioned at the image plane, the eyepiece being positioned in the optical path between the primary optics and the detector, and the at least one variable focus lens or mirror being positioned between the curvature enhancer and the detector.

2. The optical imaging system of claim 1, wherein the detector has a surface that is substantially flat in the image plane.

3. The optical imaging system of claim 1, wherein the curvature enhancer includes a cylindrical concave lens.

4. The optical imaging system of claim 1, wherein the curvature enhancer includes a pair of cylindrical lenses.

5. The eyepiece of claim 4, wherein the curvature enhancer includes a concave lens or convex mirror placed proximate the curved focal plane.

6. An eyepiece for an optical system comprising:
   a curvature enhancer configured to receive and bend incident electromagnetic radiation to produce a curved focal plane; and
   at least one variable focus lens or mirror optically coupled to the curvature enhancer and configured to receive the electromagnetic radiation from the curvature enhancer and to focus the electromagnetic radiation onto an image plane.

7. The eyepiece of claim 6, wherein the curvature enhancer includes a pair of cylindrical lenses.

8. An imaging method comprising:
   receiving incident electromagnetic radiation;
   bending the electromagnetic radiation using a curvature enhancer to form a curved focal plane;
   relaying the electromagnetic radiation with at least one lens from the curved focal plane onto a photo-sensitive detector positioned on an image plane that is spaced apart from the curved focal plane, the photo-sensitive detector having a surface that is substantially flat in the image plane, the at least one lens being positioned between the curvature enhancer and the photo-sensitive detector; and
   with the photo-sensitive detector, producing an image from the electromagnetic radiation, the image having variable lateral magnification.

9. The imaging method of claim 8, wherein the curvature enhancer includes a concave lens, and wherein bending the electromagnetic radiation includes refracting the electromagnetic radiation with the concave lens to the form the curved focal plane.

10. The imaging method of claim 8, further comprising varying an axial zoom level of the image by moving the at least one lens towards or away from the photo-sensitive detector along an optical axis extending between the curved focal plane and the image plane.

* * * * *